United States Patent
Dubey et al.

(10) Patent No.: US 11,935,305 B2
(45) Date of Patent: Mar. 19, 2024

(54) DISPLAY FOR AN AUTONOMOUS TAXI

(71) Applicant: Ford Global Technologies, LLC, Dearborn, MI (US)

(72) Inventors: Prashant Dubey, Dearborn, MI (US); Segundo Baldovino, Dearborn, MI (US); LaRon Brown, Dearborn, MI (US); Venkatesh Krishnan, Dearborn, MI (US); Mohan Kamath, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 843 days.

(21) Appl. No.: 16/981,827

(22) PCT Filed: Mar. 27, 2018

(86) PCT No.: PCT/US2018/024606
§ 371 (c)(1),
(2) Date: Sep. 17, 2020

(87) PCT Pub. No.: WO2019/190481
PCT Pub. Date: Oct. 3, 2019

(65) Prior Publication Data
US 2021/0114460 A1    Apr. 22, 2021

(51) Int. Cl.
*G06V 20/56* (2022.01)
*B60K 35/00* (2006.01)
(Continued)

(52) U.S. Cl.
CPC .............. *G06V 20/56* (2022.01); *B60K 35/00* (2013.01); *B60W 60/00* (2020.02);
(Continued)

(58) Field of Classification Search
CPC ...... G06V 20/56; G06V 10/751; G06V 20/58; B60K 35/00; B60K 2370/1438;
(Continued)

(56) References Cited

U.S. PATENT DOCUMENTS

| 2002/0196949 A1 | 12/2002 | Rodemer et al. |
| 2004/0149892 A1 | 8/2004 | Akitt et al. |

(Continued)

FOREIGN PATENT DOCUMENTS

| EP | 1231113 A2 | 8/2002 |
| WO | 2015/200224 A2 | 12/2015 |
| WO | 2017/191344 A1 | 11/2017 |

OTHER PUBLICATIONS

International Search Report of the International Searching Authority for PCT/US2018/024606 dated Jul. 12, 2018.

*Primary Examiner* — Alazar Tilahun
(74) *Attorney, Agent, or Firm* — Brandon Hicks; Eversheds Sutherland (US) LLP

(57) ABSTRACT

An applique is mounted over one or both B-pillars of an autonomous vehicle and includes a display, speaker, touch input, and microphone. The applique may include a curved cover mounted over a printed circuit board (PCB) having LED arrays mounted thereto. A diffuser defines windows for the LED arrays and has a planar surface interfacing with the PCB and a curved surface interfacing with the curved cover. A controller of the vehicle detects proximity to a passenger to be picked up and displays the passenger's name at a first proximity, outputs a spoken message at a second, closer, proximity, and outputs a visible and audible prompt to enter an access code at a third proximity closer than the second proximity.

20 Claims, 6 Drawing Sheets

(51) Int. Cl.
  *B60W 60/00* (2020.01)
  *G06V 10/75* (2022.01)
  *G06V 20/58* (2022.01)
(52) U.S. Cl.
  CPC ............ *G06V 10/751* (2022.01); *G06V 20/58* (2022.01); *B60K 2370/1438* (2019.05); *B60K 2370/148* (2019.05); *B60K 2370/166* (2019.05); *B60K 2370/178* (2019.05); *B60K 2370/739* (2019.05); *B60K 2370/788* (2019.05)
(58) Field of Classification Search
  CPC ........ B60K 2370/148; B60K 2370/166; B60K 2370/178; B60K 2370/739; B60K 2370/788; B60W 60/00
  See application file for complete search history.

(56) References Cited

U.S. PATENT DOCUMENTS

| | | | |
|---|---|---|---|
| 2013/0321740 A1* | 12/2013 | An ........................ | H05K 5/0017 |
| | | | 361/679.01 |
| 2015/0180471 A1 | 6/2015 | Buttolo et al. | |
| 2017/0123423 A1* | 5/2017 | Sako .................. | G01C 21/3438 |
| 2019/0348012 A1* | 11/2019 | Pirtle ........................ | G09G 5/12 |

\* cited by examiner

DISPLAY FOR AN AUTONOMOUS TAXI

BACKGROUND

Field of the Invention

This invention relates to implementing an autonomous taxi service.

Background of the Invention

Autonomous vehicles are the subject of much research and development. Such vehicles include a set of sensors and control logic that enables the identification and avoidance of obstacles and navigation to a destination. One application of autonomous vehicles is use as taxis that can pick up a passenger on demand.

It would be an advancement in the art to provide an improved approach for providing autonomous taxi services.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
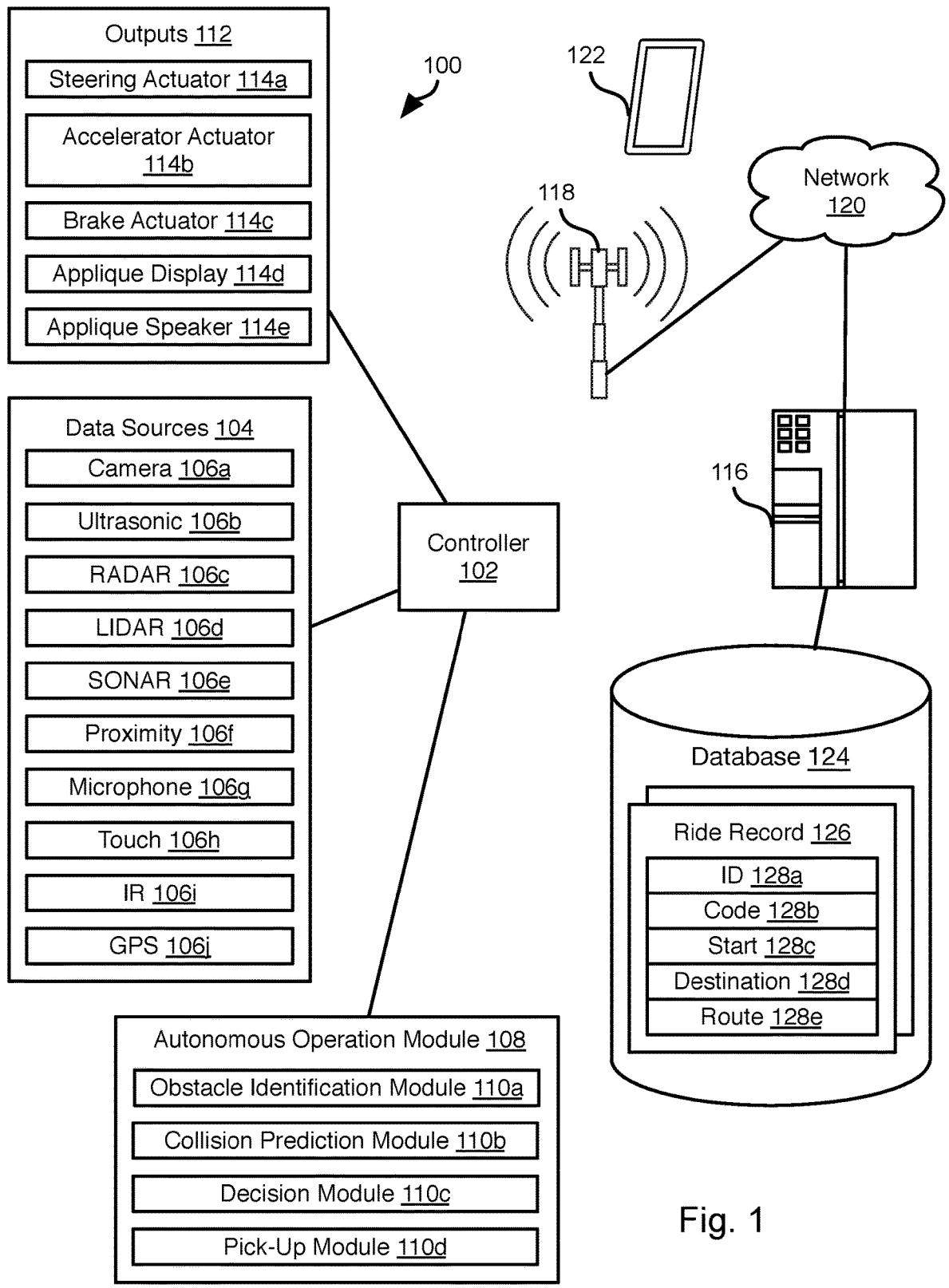
FIG. 1 is a schematic block diagram of components implementing a system in accordance with an embodiment of the present invention.

Referring to FIG. 1, the methods disclosed herein may be performed using the illustrated system 100. As discussed in greater detail herein, a controller 102 may be programmed to perform the methods disclosed herein and may also perform other functions performed by a vehicle controller (e.g., electronic control unit (ECU)) or in-vehicle infotainment (IVI). The controller 102 may be housed in a vehicle having the structures and features of any vehicle known in the art including, wheels, a drive train coupled to the wheels, an engine coupled to the drive train, a steering system, a braking system, and other systems known in the art to be included in a vehicle.

The controller 102 may receive one or more outputs from one or more data sources 104. For example, one or more cameras 106a may be mounted to the vehicle and output image streams to the controller 102. The data sources 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

Other data sources 104 may include a proximity sensor 106f, such as a BLUETOOTH LOW ENGERGY (BLE) transceiver, near field communication (NFC) transceiver, or other electronic device for performing short range (0 to 3 meters) communication.

The data sources 104 may include a microphone 106g for receiving voice inputs. The data sources 104 may include a touch sensor 106h, such as a touch screen 106h or other type of touch sensor (capacitive, resistive, infrared, push button, etc.). The data sources 104 may include an infrared (IR) sensor 106i, such as an IR sensor, IR camera, or other sensor able to detect the heat emitted by a person. The sources 104 of data may also include a GPS (global positioning system) receiver 106j.

The controller 102 may execute an autonomous operation module 108 that receives the outputs of some or all of the data sources 104. The autonomous operation module 108 may include an obstacle identification module 110a, a collision prediction module 110b, and a decision module 110c. The obstacle identification module 110a analyzes the outputs of some or all of the data sources 104 and identifies potential obstacles, including people, animals, vehicles, buildings, curbs, and other objects and structures. In particular, the obstacle identification module 110a may identify other vehicles in the sensor outputs.

The collision prediction module 110b predicts which obstacles are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

In embodiments disclosed herein, the autonomous operation module 108 may perform autonomous navigation to a specified location, autonomous parking, and other automated driving activities known in the art.

In some embodiments, the system 100 may operate as an autonomous taxi according to the method disclosed herein. Accordingly, the autonomous operation module 108 may include a pick-up module 110d that coordinates picking up of a passenger according to the methods disclosed hereinbelow.

The controller 102 may control one or more outputs 112 in order to autonomously drive the vehicle and to coordinate picking up of a passenger according to the methods described hereinbelow. For example, the decision module 110c may control the trajectory of the vehicle by actuating one or more actuators controlling the direction and speed of the vehicle 100. For example, the actuators may include a steering actuator 114a, an accelerator actuator 114b, and a brake actuator 114c. The configuration of the actuators 114a-114c may be according to any implementation of such actuators known in the art of autonomous vehicles.

The controller 102 may further control outputs of a display 114d on an applique mounted over a B-pillar of a vehicle as described in greater detail below. The controller 102 may also output audible prompts from a speaker in the applique as described below. Some or all of the proximity sensor 106f, microphone 106g, touch sensor 106h, and IR sensor 106i may also be mounted to the applique as described in greater detail below.

The controller 102 may communicate wirelessly with a server 116. For example, the controller 102 may communicate with cellular data communication infrastructure 118. The infrastructure 118 may be in data communication with a network 120, such as the Internet, with which the server 116 is also in data communication. The controller 102 and server system 116 may be in data communication with mobile devices 122 of passengers, such as by way of the cellular data communication infrastructure 118.

The server system 116 may host or access a database 124 of rider information in order to dispatch the controller 102 to pick up passengers. For example, a passenger may request a ride from a mobile device 122 or other computing device of the passenger. The server system 116 may then create a record 126 of parameters for that ride as received from the passenger or known from a profile of the passenger. For example, the record 126 may include an identifier (e.g. name) 128a of the passenger, a code 128b provided to the passenger in order to authenticate with the controller 102, a start location 128c, a destination location 128d, and possibly route information 128e between the start 128c and destination 128d. The record 126 may also indicate a desired time of pick-up received from the passenger.

Figure 2:
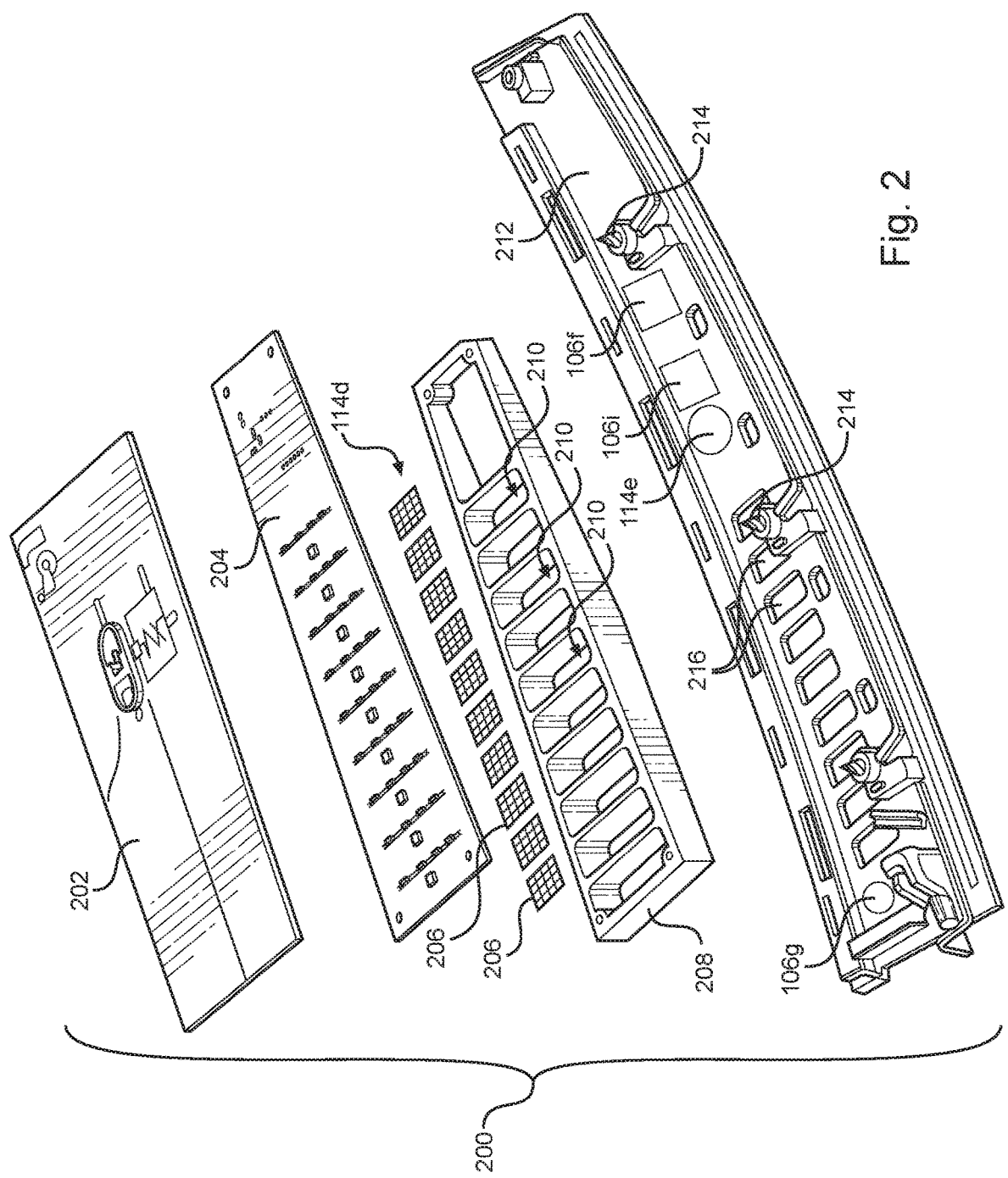
FIG. 2 is an exploded view of an applique for a vehicle in accordance with an embodiment of the present invention.

Referring to FIG. 2, the applique mounted to the B-pillar of the vehicle may be embodied as the illustrated applique 200. The illustrated applique 200 may include a power supply 202, which may be coupled to the battery of the vehicle. The applique 200 may include a printed circuit board (PCB) 204 coupled to the power supply 202. The PCB 204 may include circuits for providing outputs and receiving inputs according to the methods disclosed herein.

In particular, the PCB 204 may have the display 114d mounted thereon. In the illustrated embodiment, the display 114d is embodied as arrays 206 of LEDs (light emitting diodes) or other light emitting structures. In the illustrated embodiment, the arrays 206 are each embodied as a four-by-four arrays of LEDs, however larger LED arrays may also be used. The number of LEDs in each array 206 is preferably sufficient to enable the LED to render alphanumeric characters A through Z and 1-9. For whichever language used, the LED arrays 206 preferably have sufficient size to render characters according to that language. In the illustrated embodiment, ten arrays 206 are shown. However, any number of arrays 206 may be used subject to the size constraints of the applique 200. For example, the illustrated applique 200 may include from ten to twenty LED arrays 206.

In other embodiments, rather than discrete arrays 206, the display 114d may be an elongate screen (LED, LCD (liquid crystal display), OLED (organic light emitting diode), etc.) extending along the long dimension of the applique 200. The screen may be embodied as a touch screen.

In many instances, the applique 200 may be required to have an outer surface conforming to a curved shape of a vehicle in order to preserve the design aesthetic of the vehicle. However, the PCB 204 may be constrained to be flat. In some embodiments a diffuser 208 may be used. The diffuser 208 may be made of silicon and may function to isolate the arrays 206 from one another by attenuating or otherwise diffusing light passing between arrays 206.

In the illustrated embodiment the diffuser 208 includes windows 210 passing therethrough, each window 210 being positioned over one of the LED arrays 206.

The applique 200 may further include a cover 212. The cover 212 may be made of metal, plastic, or other material suitable for forming the exterior covering of a vehicle. The cover 212 may include mounting structures 214 for securing the cover 212 to the body of the vehicle. The cover 212 may further include windows 216 positioned over each LED array 206 when the PCB and cover 212 are mounted to the vehicle body. The windows 216 may include thinned portions of the cover 212 permitting light to pass therethrough. For example, the cover 212 may be made of a translucent plastic with tinting. The windows 216 may be made sufficiently thin such that the LED arrays 206 are visible therethrough notwithstanding the tinting. In other embodiments, the windows 216 are separate pieces mounted within openings formed in the cover 212.

In some embodiments, other structures may be mounted to the cover 212 or elsewhere on the applique 200, such as the PCB 204. These may include the microphone 106g, proximity sensor 106f, IR sensor 106i, and speaker 114e. The cover 212 may define suitable apertures for permit sensing by the sensors 1066, 106f, 106i and may further include apertures for permitting the speaker 114e to emit sound through the cover 212.

Figure 3:
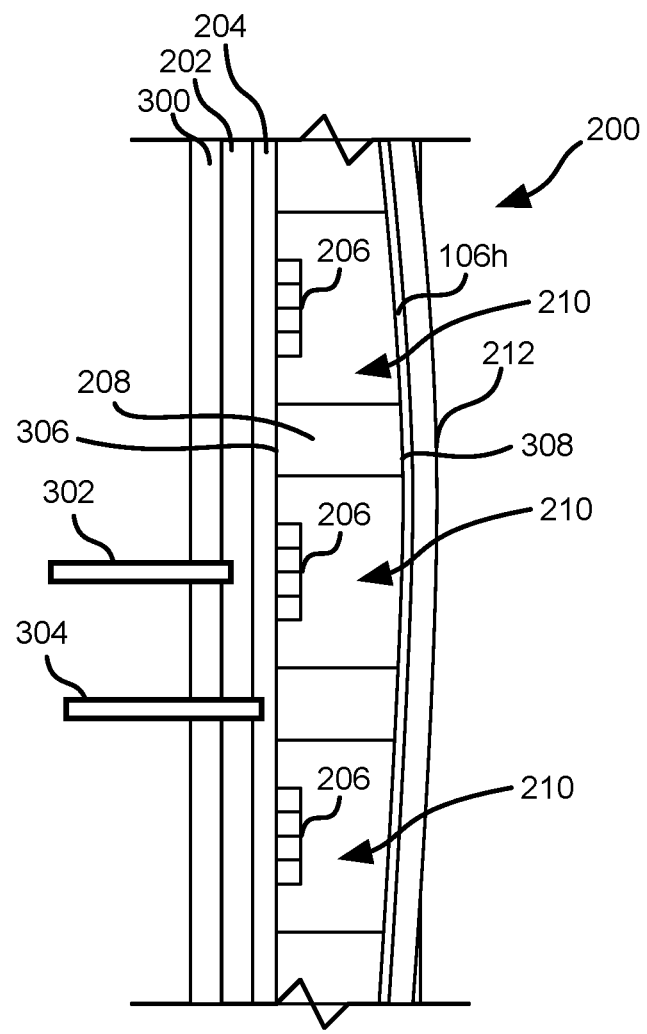
FIG. 3 is a cross-sectional view of an applique in accordance with an embodiment of the present invention.

FIG. 3 illustrates a portion of the applique 200 as mounted to the body 300 of a vehicle. The applique 200 may mount to the B-pillar of the vehicle or to a portion of a door frame positioned over the B-pillar when closed. A cable 302 may mount to the power supply 202 and be connected to a battery of the vehicle. A data cable 304 may be coupled to the PCB 204 and provide a data connection to the controller 102.

As shown in FIG. 3, the cover 212 may be curved to conform to the contours of the vehicle and to preserve a design aesthetic of the vehicle. Accordingly, the diffuser 208 may have a flat surface 306 facing the PCB 204 and a curved surface 308 facing the cover 212. The diffuser 208 therefore acts as an adapter or bridge between the planar PCB 204 and the curved cover 212.

The windows 210 defined by the diffuser 208 may be filled with air or may be filled with a solid material, such as transparent plastic, glass, or other material enabling light from the LED arrays 206 to pass through to the cover 212. As noted above, the cover 212 may include translucent portions over the windows 210 to render the LED arrays 206 visible through the cover 212.

In some embodiments, the applique 200 also functions as a touch screen. Accordingly, one or more touch sensors 106h may be mounted to the applique, such as on an outer surface of the cover 212, between the cover 212 and the diffuser 208, as individual touch sensitive elements mounted within each window 210. As noted above, the touch sensor 106h may be embodied as an IR touch sensor, resistive touch sensor, capacitive touch sensor, push button, or any other type of pressure sensing device known in the art. The portion of the touch sensor 106h over each window 210 is preferably transparent or translucent.

Figure 4:
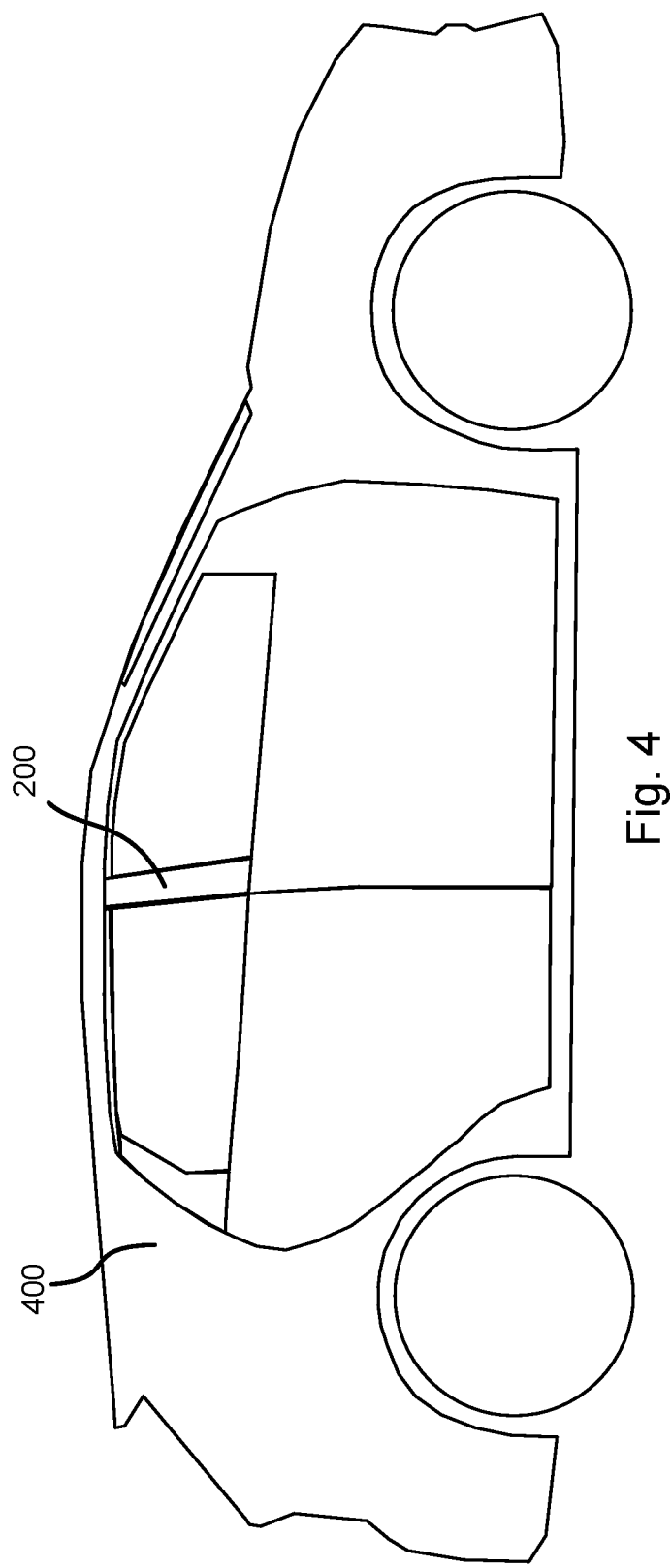
FIG. 4 is a side view of a vehicle having an applique in accordance with an embodiment of the present invention.

FIG. 4 illustrates a vehicle 400 that may incorporate the elements of the system 100 described above with respect to FIG. 1. As shown, the applique 200 mounts to the body of the vehicle over the B-pillar, such as by mounting directly to the B-pillar or by mounting to a portion of a door frame over the B-pillar. FIG. 4 shows the applique 200 only on the right side of the vehicle 400 for use in jurisdictions where vehicles drive on the right side of the road. Where the vehicle is used in a jurisdiction where vehicles drive on the left side of the road, the applique 200 may be mounted over the B-pillar on the left side of the vehicle. In some embodiments, appliques 200 are positioned over the B-pillars on both the right and left sides of the vehicle.

Figure 5:
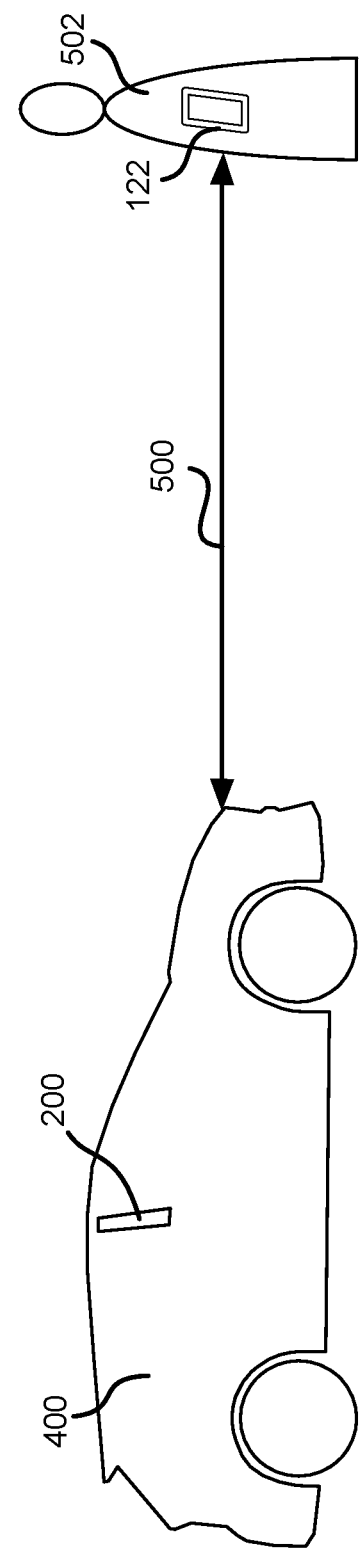
FIG. 5 is side view illustrating operation of an autonomous taxi in accordance with an embodiment of the present invention.

Referring to FIG. 5, as discussed in greater detail below with respect to FIG. 6, the information displayed or otherwise output from the applique 200 may be changed by the controller 102 based on a distance 500 between the vehicle 400 and the passenger 502, such as based on a distance 500 between the vehicle 400 and the mobile device 122 of the passenger 502.

At large distances, e.g. greater than two meters, the separation may be determined based on GPS coordinates measured by the GPS receiver 106j of the controller 102 and GPS coordinates measured by a GPS receiver of the mobile device 122. For example, the mobile device 122 may transmit its GPS coordinates to the controller 102, such as by way of the server system 116 or directly. The controller 102 may then compare these coordinates to determine the separation 500.

At small distances, e.g., less than two meters, proximity to the passenger 502 may be detected using a different modality, either alone or in combination with GPS coordinates. For example, proximity may be detected using a proximity sensor 106f as described above. Proximity of a person to the applique 200 may also be sensed using an IR sensor 106i, i.e. by sensing heat emitted by the passenger to distinguish from inanimate objects. Other modalities may include using some or all of the other sensors 106a-106e. Accordingly, at small distances, the proximity may be estimated as a combination of proximities measured using multiple modalities, such as an average or weighted average of proximities measured using multiple modalities.

Figure 6:
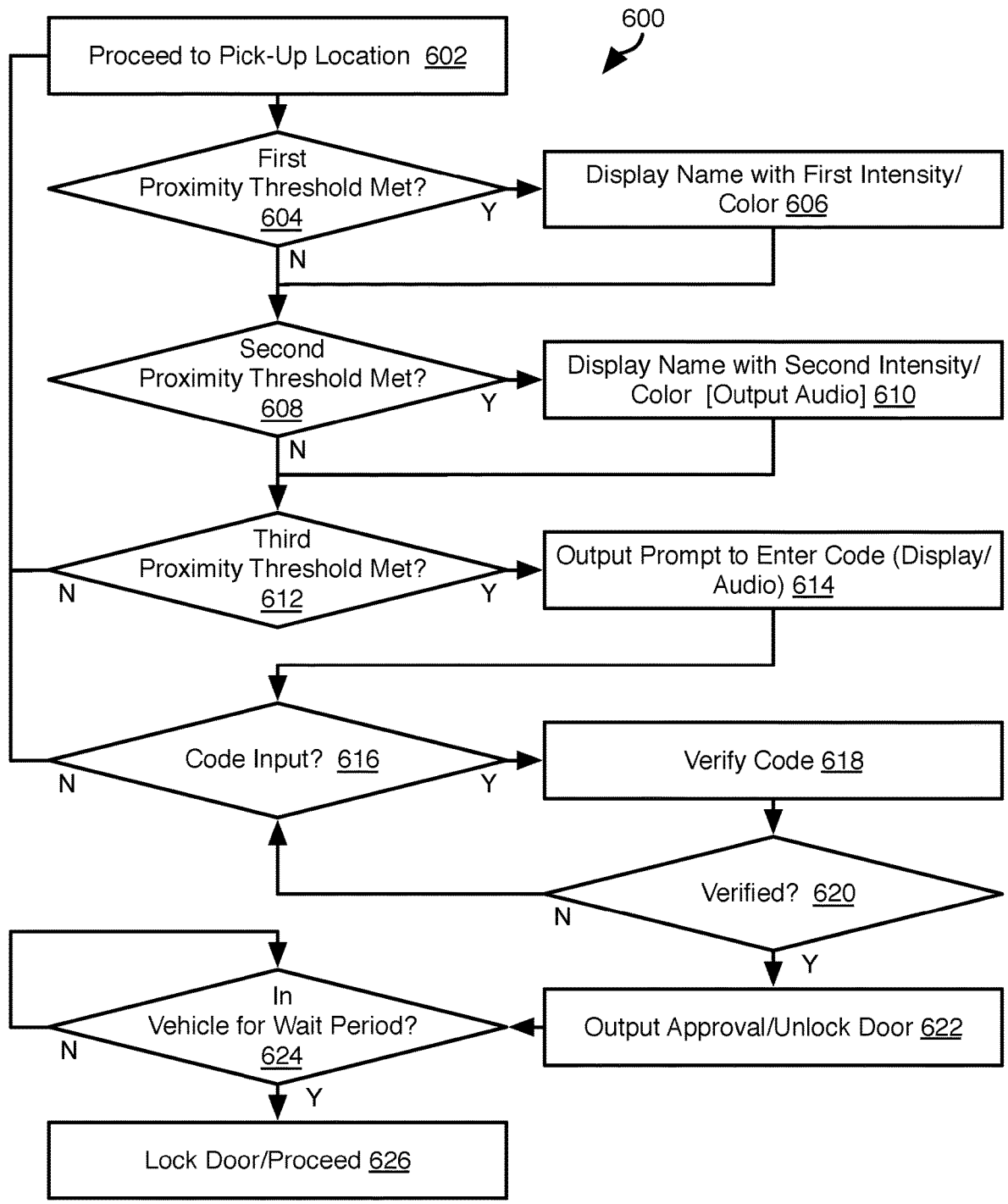
FIG. 6 is a process flow diagram of a method for operating an autonomous taxi in accordance with an embodiment of the present invention.

Referring to FIG. 6, the illustrated method 600 may be executed by the controller 102 following receiving an instruction from the server system 116 to pick up a passenger. The method 600 may presume that the controller 102 received a pick up location for the passenger and that the mobile device 122 of the passenger continues to provide the passenger's location to the controller 102 either directly or by way of the server system 116. Alternatively, the method 600 may presume that the passenger is at the pick-up location such that updating of the passenger's location is not required until proximity may be sensed using a modality such as a proximity sensor 106f or IR sensor 106i.

The method 600 may include autonomously proceeding 602 to the pick-up location. Where the controller 102 receives updates as to the current location of the passenger, step 602 may include updating the pick-up location to be the current location and altering the route from the vehicle's current location to the new pick-up location accordingly. Step 602 may include performing obstacle avoidance and other functions of autonomous vehicles in order to arrive safely at the pick-up location.

As the controller 102 autonomously proceeds 602 the vehicle to the pick-up location, the method 600 may further include evaluating proximity of the vehicle to the passenger. For example, where the proximity is found 604 to meet a first proximity threshold, the controller 102 may cause the applique to display 606 the name of the passenger or other information, such as an identifier provided to the passenger to enable identification of the vehicle on arrival. In some embodiments, the first proximity threshold is two meters. In other embodiments, the first proximity threshold is a value between 2 and 6.5 meters.

The display of step 606 may have visual attributes that distinguish over displays performed at closer proximity thresholds. For example, the information displayed at step 606 may be red and may have a first intensity that is less than an intensity of displays meeting closer proximity thresholds.

When the proximity to the passenger is found 608 to meet a second proximity threshold that is less than the first proximity threshold, the controller 102 may cause the applique to display 610 the same information from step 606, but in a visually distinguishable manner. Step 610 may include displaying different information as well. In some embodiments, the second proximity threshold is one meter. In other embodiments, the second proximity threshold is less than the first proximity threshold and is a value between one and three meters. In some embodiments, the information displayed at step 610 has a different color than for step 606, such as yellow rather than red. The display of step 610 may also have a greater intensity (e.g. 10-20 percent more) than the display of step 606. In some embodiments, the display of step 610 may be flashing whereas the display of step 606 is not. Step 610 may also include outputting an audio rendition of the displayed information using the speaker 114e of the applique 200 in response to finding 608 the second proximity threshold to be met. In some embodiments, 606 may also include outputting an audio rendition of the displayed information using the speaker 114e.

When the proximity to the passenger is found 612 to meet a third proximity threshold that is less than the second proximity threshold, the controller 102 may cause the applique to output 614 a prompt to enter an authentication code. This may include both displaying a prompt, e.g. "[passenger name or identifier] please enter code" on the display 114d, and outputting an audible prompt using the speaker 114e, e.g. a voice speaking the words "[passenger name or identifier] please enter your code." Where the display 114d has insufficient space to simultaneously display all the characters of the prompt, the prompt may be shown in a sequence of segments or as a scrolling message across the display 114d. The message displayed at step 614 may have greater intensity than the display at step 610, e.g., 25% higher intensity. The display at step 614 may be on one side of the vehicle 400 facing the passenger whereas the display of one or both of steps 610 and 606 are on both sides of the vehicle in some embodiments.

In some embodiments, the third proximity threshold is 0.5 meters. In other embodiments, the third proximity threshold is less than the second proximity threshold and is a value between 0.5 and 1.5 meters. As noted above, detecting proximity around the third proximity threshold may be performed using multiple modalities including two or more of GPS coordinates, a proximity sensor 106f, and an IR sensor 106i.

In some embodiments, when the proximity is found to meet the third threshold (or meet the second threshold in some embodiments), the controller 102 may also perform a warning function. For example, where outputs of the data sources 104 indicate a hazard (cyclist, vehicle, etc.) approaching the location of the passenger, the controller 102 may cause the applique 200 to output a warning using some or all of the speaker 114e, a piezo electric buzzer incorporated into the applique 200, the display 114d, or some other means. Such warnings may assist an impaired passenger when crossing the street or otherwise approaching the vehicle in the presence of traffic.

The method 600 may include evaluating 616 whether a code has been input. The code may be detected by receiving selections of characters using the touch sensor 106h or receiving a spoken message including a code using the microphone 106g. For example, following display of the prompt at step 614, the display 114d may display numerals (e.g., 0 to 9), that the passenger may select by touching the applique over the numeral. The display of the prompt 614 and display of the numerals may alternate, e.g. every three seconds, absent detection of user selection of a numeral.

The method 600 may include attempting 618 to verify the code received. For a manually input code using the touch sensor 106h, this may include comparing a sequence of numbers selected by the passenger to a code received from the server system 116. For example, a predetermined code may be transmitted by the server system 116 to the controller 102 and to the mobile device 122 of the passenger when the passenger requests a ride. If the codes received at step 616 matches the predetermined code provided to the controller 102 by the server system 116, the passenger may be determined 620 to be verified. For a spoken code, the output of the microphone 106g may be processed using a speech-to-text algorithm. The text output from the algorithm may then be evaluated to determine any sequence of numbers included in the text. Where this sequence number matches the predetermined code, the passenger may be determined 620 to be verified.

When the code is determined 620 to be verified, the method 600 may include outputting 622 an approval on the applique display 114d and/or speaker 114e. For example, the message "Code OK" may be output on the display 114d. The speaker 114e may likewise output a spoken message saying "code accepted, please enter." When the code is not verified 620, processing may continue at step 616 with another opportunity to enter the code. For example, a displayed and audible message may be output indicating that the code was not verified, e.g., "Code Not OK" or "Code Not Accepted."

The controller 102 may further unlock one or more doors of the vehicle and output a visible and/or audible prompt to the passenger to enter the vehicle.

The method 600 may further include waiting 624 for a wait period following detection of opening and closing of a door of the vehicle. If no doors open during the wait period following closing of the door of the vehicle, the controller 102 may invoke locking of the doors of the vehicle and autonomously proceed 626 to a destination specified by the passenger when requesting the ride.

Figure 7:
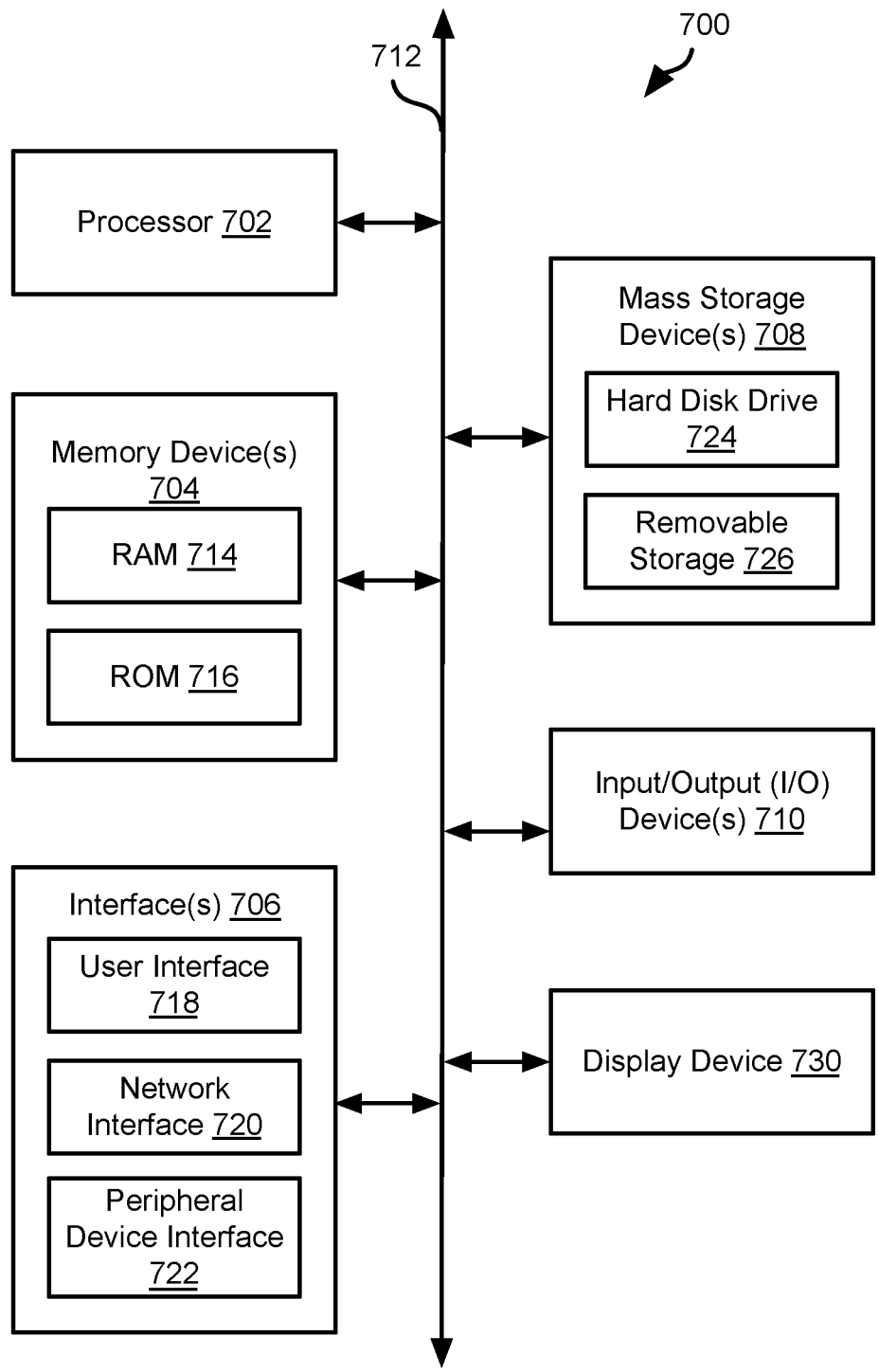
FIG. 7 is a schematic block diagram of an example computing device suitable for implementing methods in accordance with embodiments of the invention.

FIG. 7 is a block diagram illustrating an example computing device 700. Computing device 700 may be used to perform various procedures, such as those discussed herein. The controller 102, server system 116, and mobile devices 122 may have some or all of the attributes of the computing device 700.

Computing device 700 includes one or more processor(s) 702, one or more memory device(s) 704, one or more interface(s) 706, one or more mass storage device(s) 708, one or more input/output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, I/O device(s) 710, and display device 730 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An autonomous vehicle comprising:
a vehicle body having a B-pillar on a side of the vehicle;
an applique mounted to the vehicle body over the B-pillar and including a power supply coupled to an exterior of the vehicle body, a microphone, a speaker, a touch interface, and a display facing away from an interior of the autonomous vehicle in order to communicate with a passenger positioned external to and spaced from the autonomous vehicle such that the autonomous vehicle functions as an autonomous taxi, wherein the power supply is disposed between the exterior of the vehicle body and the display; and
a controller coupled to the applique and programmed to:
output messages to the passenger using the display and speaker;

receive inputs from the passenger using the microphone and touch interface; and unlock one or more doors of the autonomous vehicle and output a visible and/or audible prompt to the passenger to enter the vehicle.

2. The autonomous vehicle of claim 1, wherein the applique is mounted to one of the B-pillar of the vehicle body and a door frame positioned over the B-pillar when closed.

3. The autonomous vehicle of claim 1, wherein the applique has a curved outer surface.

4. The autonomous vehicle of claim 3, wherein the applique comprises:
   a curved cover;
   a printed circuit board (PCB), the touch interface and display being mounted to the PCB, the touch interface being positioned external with respect to the vehicle body;
   and a diffuser having a flat surface facing the PCB and a curved surface opposite the flat surface facing the curved cover, the cover having a curved inner surface facing the curved surface.

5. The autonomous vehicle of claim 4, wherein the display comprises a plurality of display clusters mounted to the PCB; and
   wherein the diffuser comprises a plurality of openings positioned over the plurality of display clusters.

6. The autonomous vehicle of claim 5, wherein the plurality of openings are filled with a solid transparent material.

7. The autonomous vehicle of claim 5, wherein the plurality of display clusters are each an array of light emitting diodes (LED) each disposed external with respect to said vehicle body.

8. The autonomous vehicle of claim 1, wherein the controller is further programmed to:
   detect that the passenger is within a first proximity threshold to the autonomous vehicle;
   and in response to detecting that the passenger is within the first proximity threshold to the autonomous vehicle, display an identifier associated with the passenger on the display without outputting an audio signal using the speaker.

9. The autonomous vehicle of claim 8, wherein the controller is further programmed to:
   detect that the passenger is within a second proximity threshold to the autonomous vehicle;
   in response to detecting that the passenger is within the second proximity threshold to the vehicle, display the identifier on the display and output an audio rendition of the passenger's name using the speaker.

10. The autonomous vehicle of claim 9, wherein the controller is further programmed to:
    detect that the passenger is within a third proximity threshold to the autonomous vehicle;
    in response to detecting that the passenger is within the third proximity threshold to the autonomous vehicle, display a request for a code on the display and output an audio rendition of a request for the code using the speaker;
    receive an input from the passenger through one of the microphone and the touch interface;
    and when the input matches the code, unlock the one or more doors of the vehicle.

11. The autonomous vehicle of claim 10, wherein the third proximity threshold is less than or equal to 0.5 meter.

12. The autonomous vehicle of claim 10, wherein the controller is further programmed to, when the input matches the code:
    detect opening and closing of the door of the autonomous vehicle;
    wait for a delay period; and
    autonomously navigating to a destination after waiting for the delay period.

13. The autonomous vehicle of claim 10, wherein the controller is further programmed to evaluate proximity of the passenger to the autonomous vehicle by evaluating global positioning system (GPS) coordinates received from a mobile device of the passenger.

14. The autonomous vehicle of claim 13, wherein the controller is further programmed to evaluate whether the passenger is within the third proximity threshold to the autonomous vehicle by evaluating both of global positioning system (GPS) coordinates received from the mobile device of the passenger and an output of a proximity sensor.

15. The autonomous vehicle of claim 14, wherein the proximity sensor is an infrared sensor.

16. The autonomous vehicle of claim 13, further comprising one or more external sensors including at least one of a camera, a LIDAR (light detection and ranging) sensor, and a RADAR (radio detection and ranging) sensor;
    wherein the controller is further programmed to:
    when outputs of the one or more external sensors indicate a hazard to the passenger, output an audible warning using one of the speaker, a piezo-electric buzzer, and the display.

17. A method comprising:
    detecting, by an autonomous vehicle, that a passenger is within a first proximity threshold to the autonomous vehicle;
    in response to detecting that the passenger is within the first proximity threshold to the autonomous vehicle, display the passenger's name on a display mounted over the B-pillar on a side of the autonomous vehicle and without outputting an audio rendition of the passenger's name using a speaker, wherein the display is powered by a power supply coupled to an exterior of a body of the autonomous vehicle, wherein the display faces away from an interior of the autonomous vehicle in order to communicate with the passenger when positioned external to and spaced from the autonomous vehicle such that the autonomous vehicle functions as an autonomous taxi, and wherein the power supply is disposed between the exterior of the vehicle body and the display;
    detecting, by the autonomous vehicle, that the passenger is within a second proximity threshold to the autonomous vehicle; and
    in response to detecting that the passenger is within the second proximity threshold to the autonomous vehicle, displaying, by the autonomous vehicle, the passenger's name on the display and output the audio rendition of the passenger's name using the speaker;
    detecting that the passenger is within a third proximity threshold to the autonomous vehicle;
    in response to detecting that the passenger is within the third proximity threshold to the autonomous vehicle, displaying, by the autonomous vehicle, a request for a code on the display and outputting an audio rendition of a request for the code using the speaker;
    receiving, by the autonomous vehicle, an input from the passenger through one of a microphone and a touch interface; and when the input matches the code, unlocking, by the autonomous vehicle, a door of the autonomous vehicle and outputting a visible and/or audible prompt to the passenger to enter the vehicle.

18. The method of claim 17, wherein the third proximity threshold is less than or equal to 0.5 meter.

19. The method of claim 17, further comprising:
detecting, by the autonomous vehicle, opening and closing of the door of the autonomous vehicle;
waiting, by the autonomous vehicle, for a delay period; and
autonomously navigating, by the autonomous vehicle, to a destination after waiting for the delay period.

20. The method of claim 17, further comprising:
evaluating, by the autonomous vehicle, whether proximity of the passenger to the autonomous vehicle is within the first proximity threshold and second proximity threshold by evaluating global positioning system (GPS) coordinates received from a mobile device of the passenger;
evaluating, by the autonomous vehicle, whether the passenger is within the third proximity threshold to the autonomous vehicle by evaluating both of global positioning system (GPS) coordinates received from the mobile device of the passenger and an output of a proximity sensor.

* * * * *